April 21, 1931.   C. E. CHALMERS   1,801,800
TICKET DISPENSING MACHINE
Filed Feb. 18, 1927    12 Sheets-Sheet 1
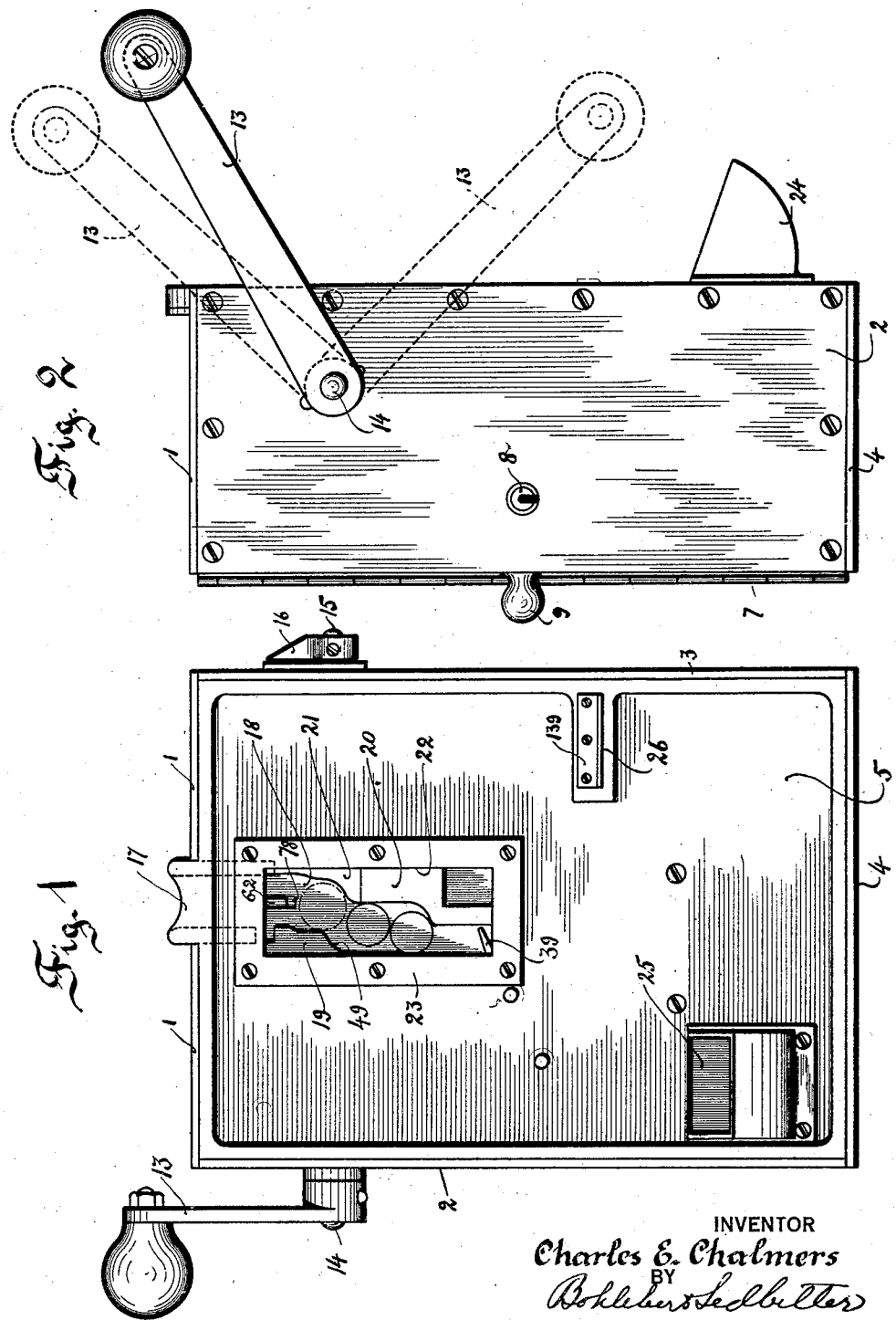
INVENTOR
Charles E. Chalmers
BY
ATTORNEYS April 21, 1931.   C. E. CHALMERS   1,801,800
TICKET DISPENSING MACHINE
Filed Feb. 18, 1927   12 Sheets-Sheet 2
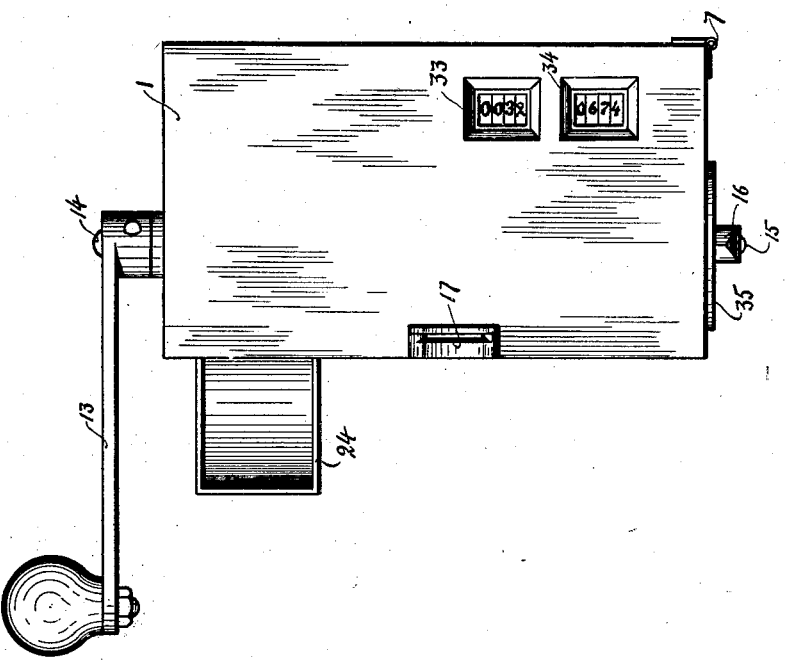
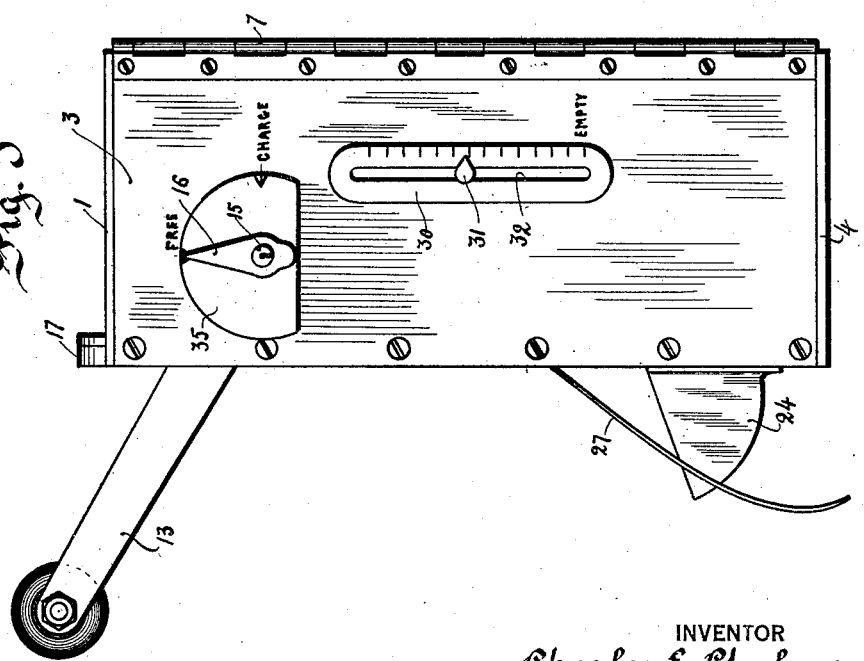
INVENTOR
Charles E. Chalmers
BY
ATTORNEYS

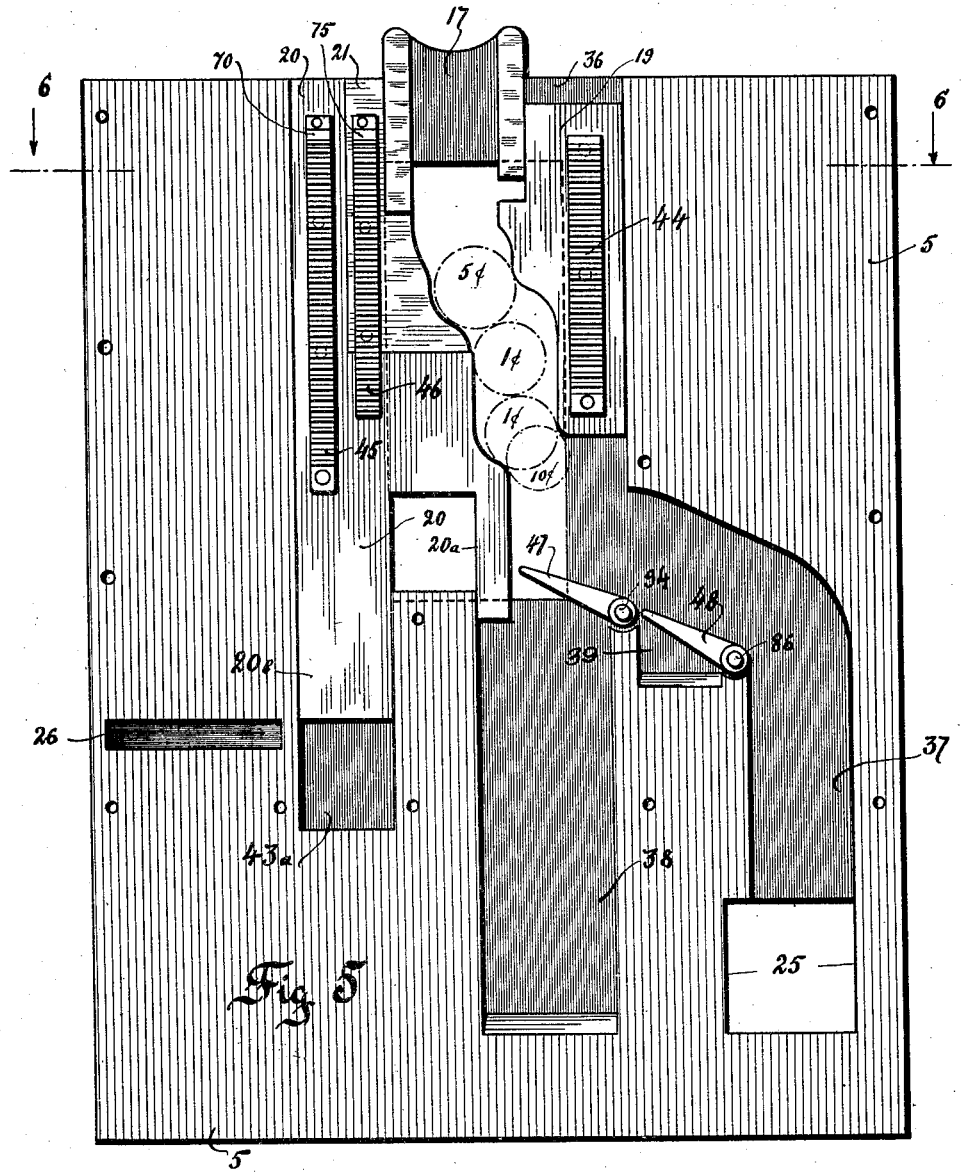
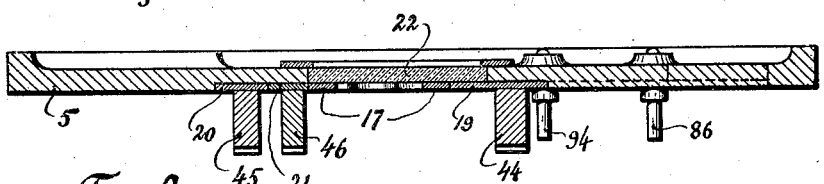

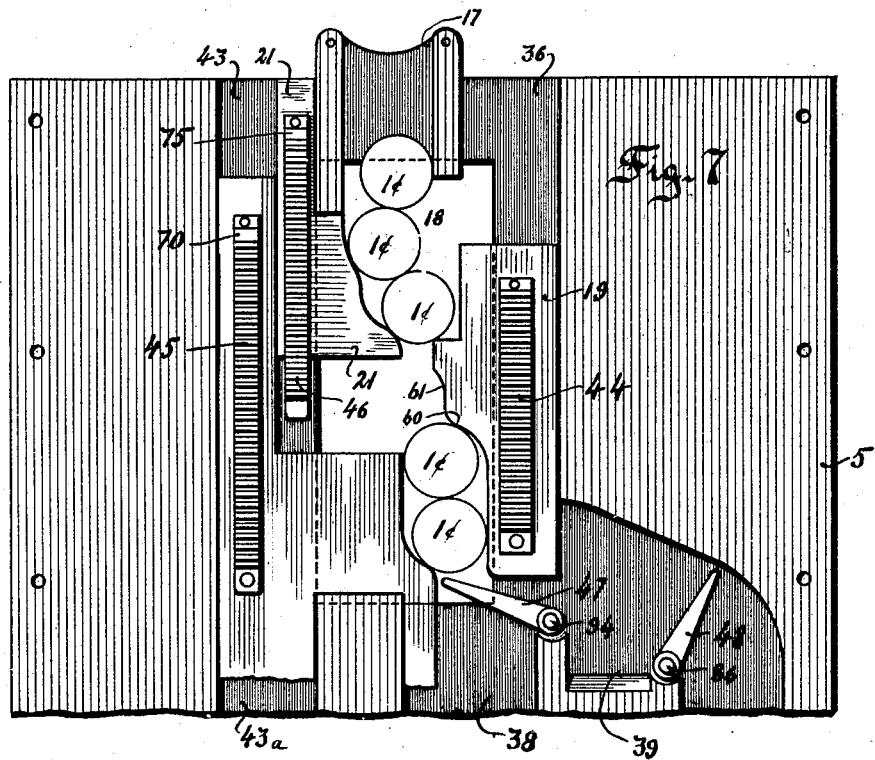
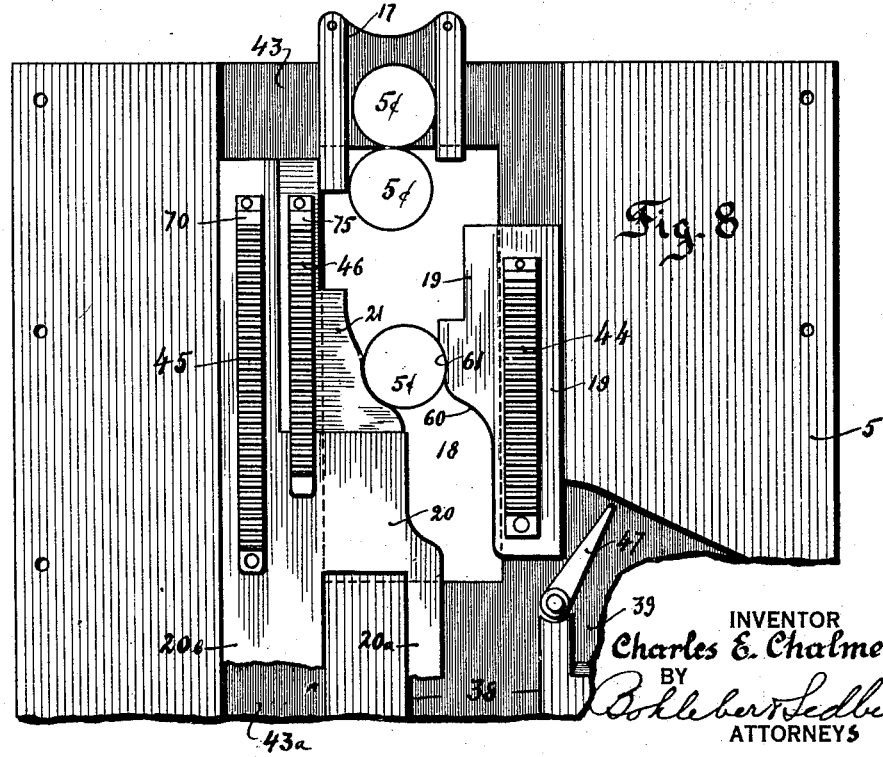

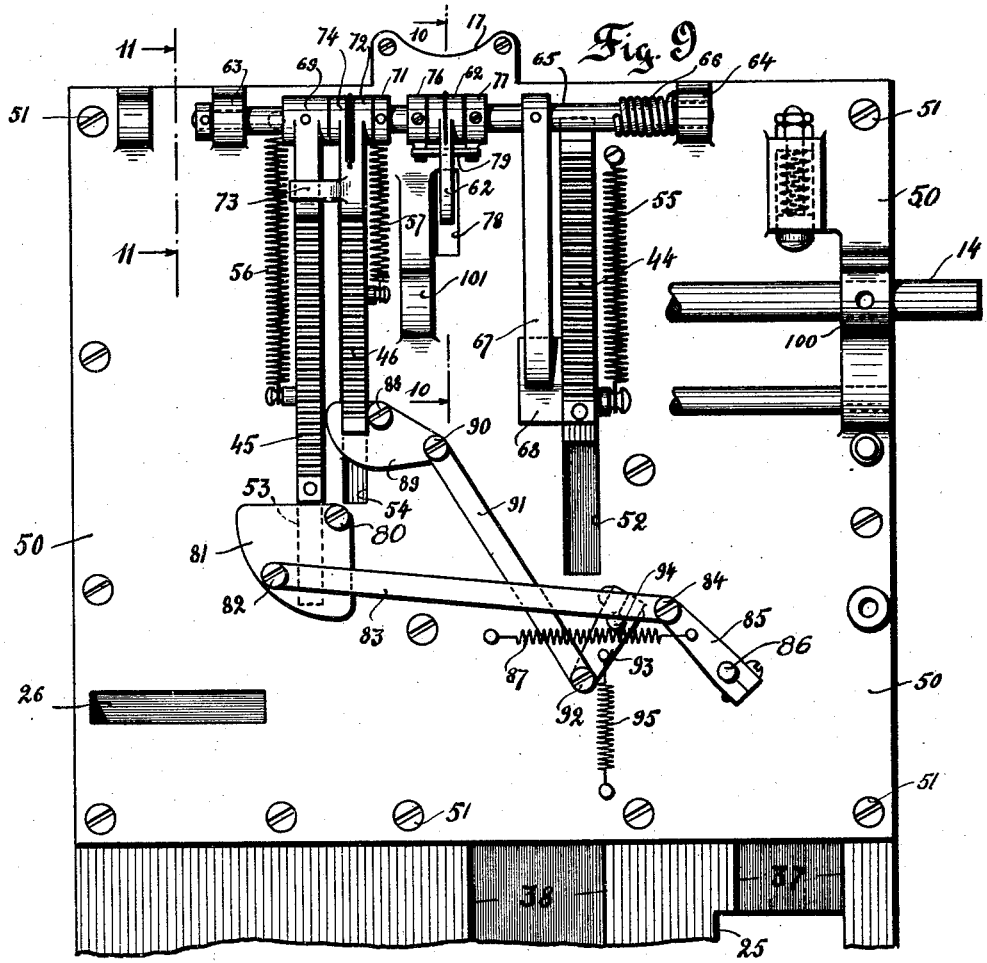

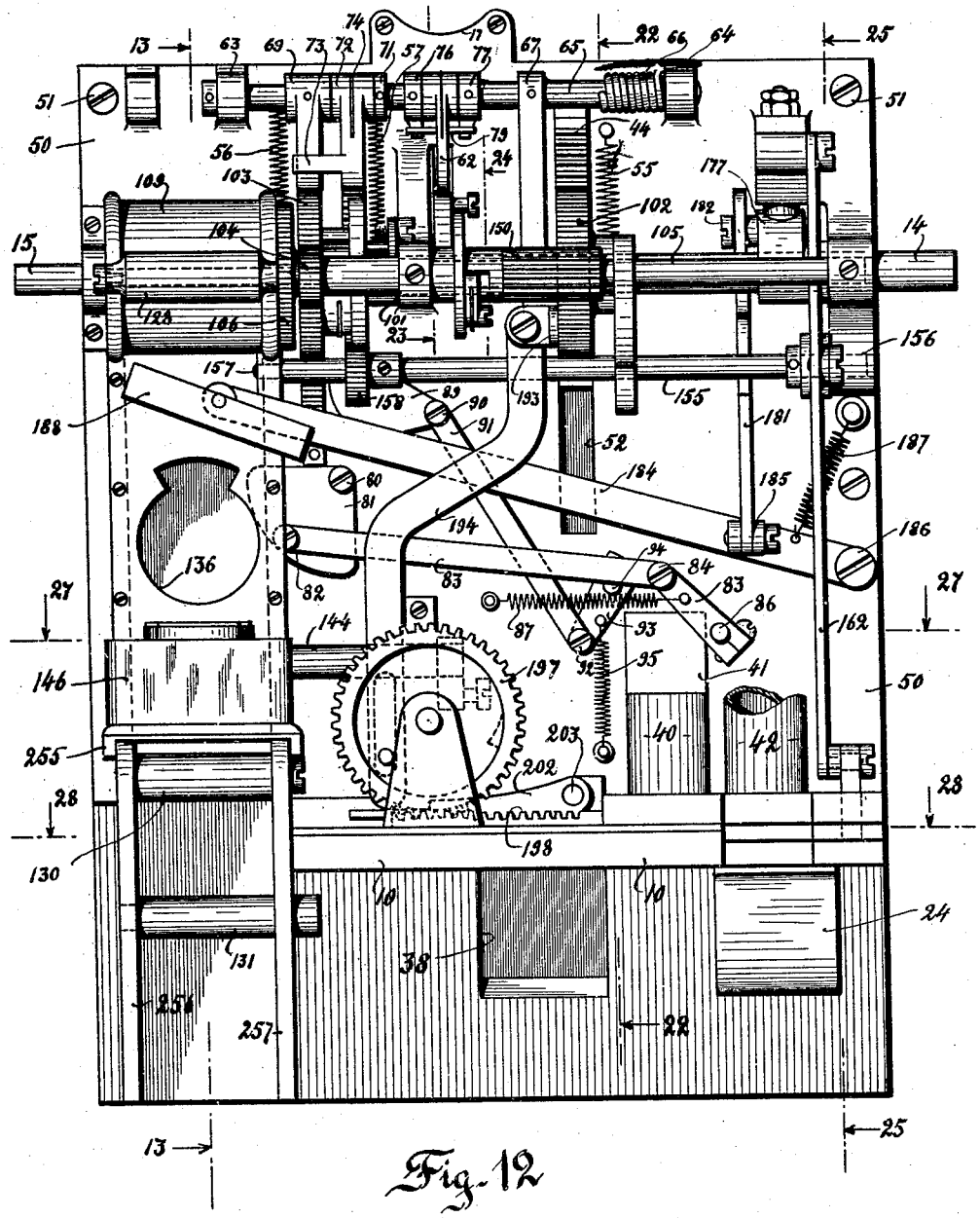

April 21, 1931.  C. E. CHALMERS  1,801,800
TICKET DISPENSING MACHINE
Filed Feb. 18, 1927   12 Sheets-Sheet 7
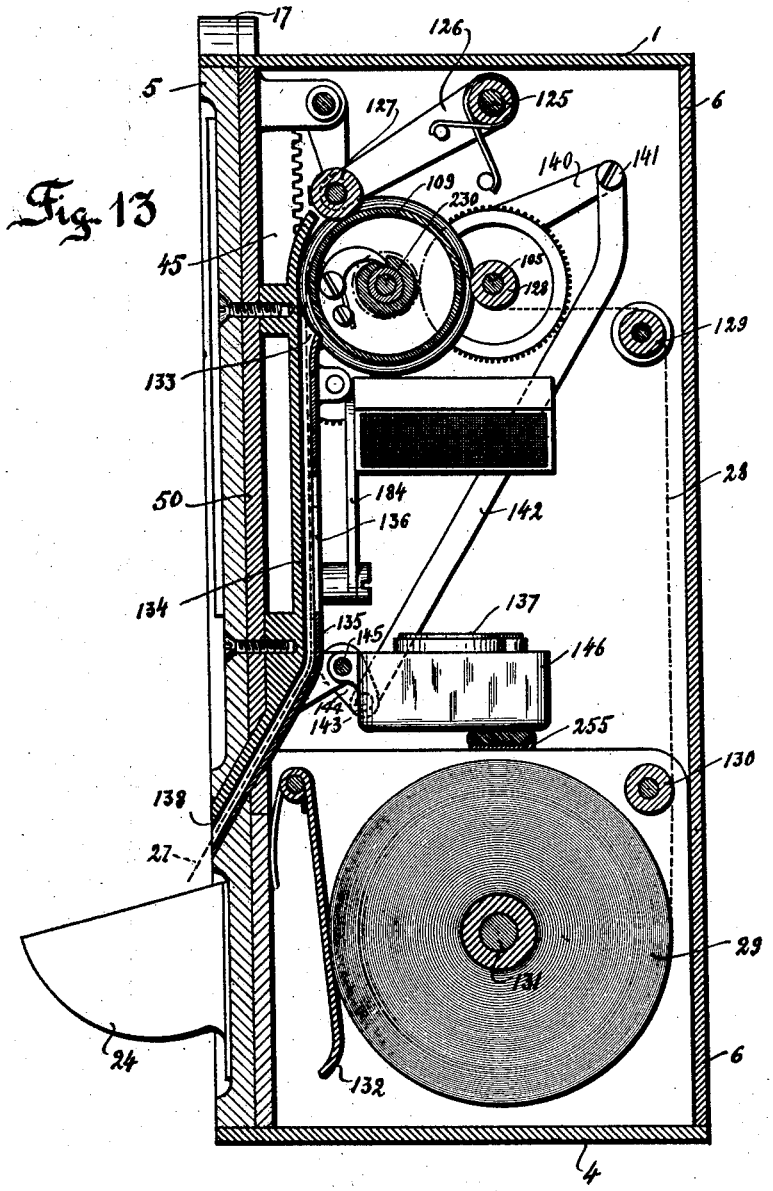
INVENTOR
Charles E. Chalmers
BY
ATTORNEYS

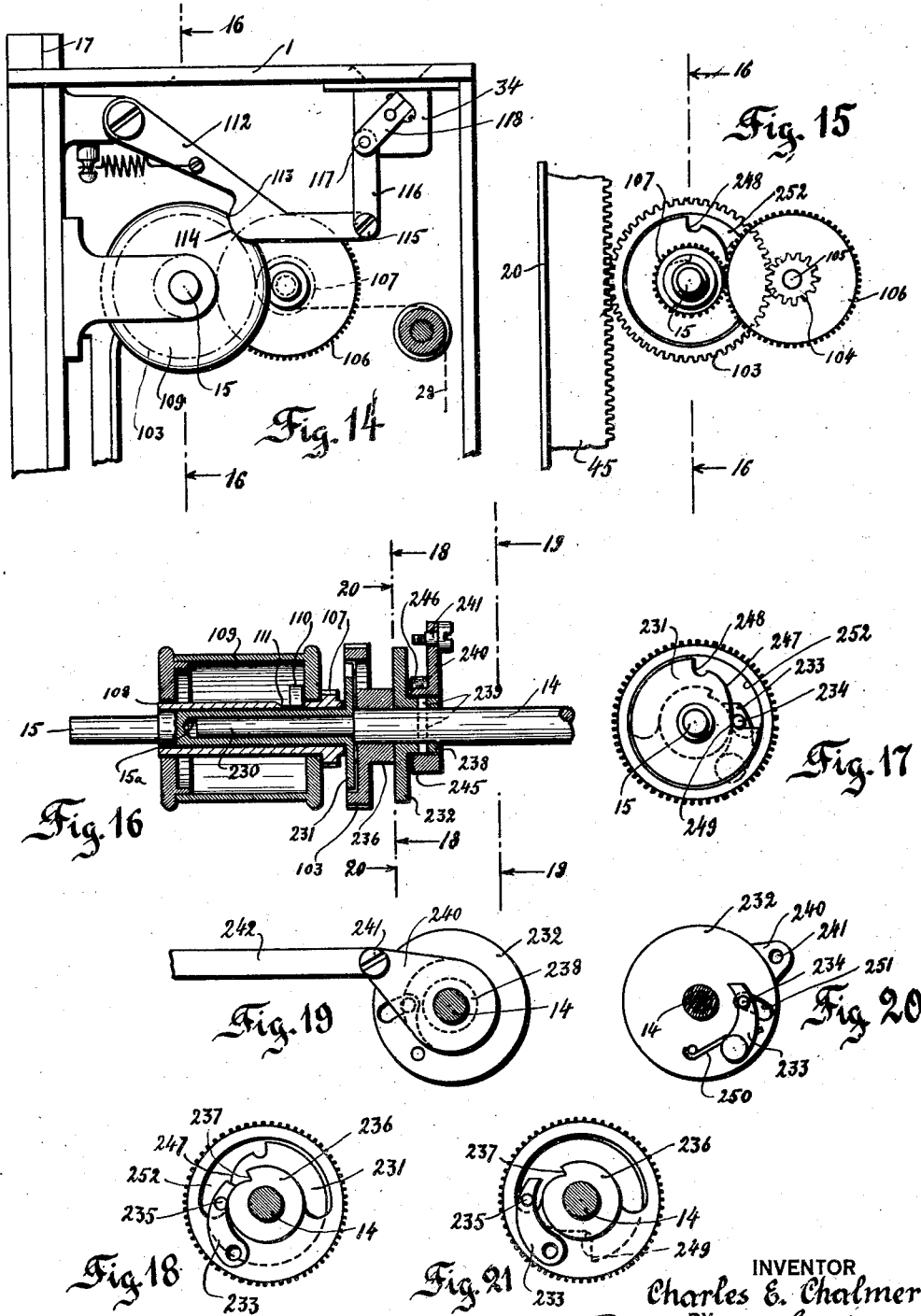

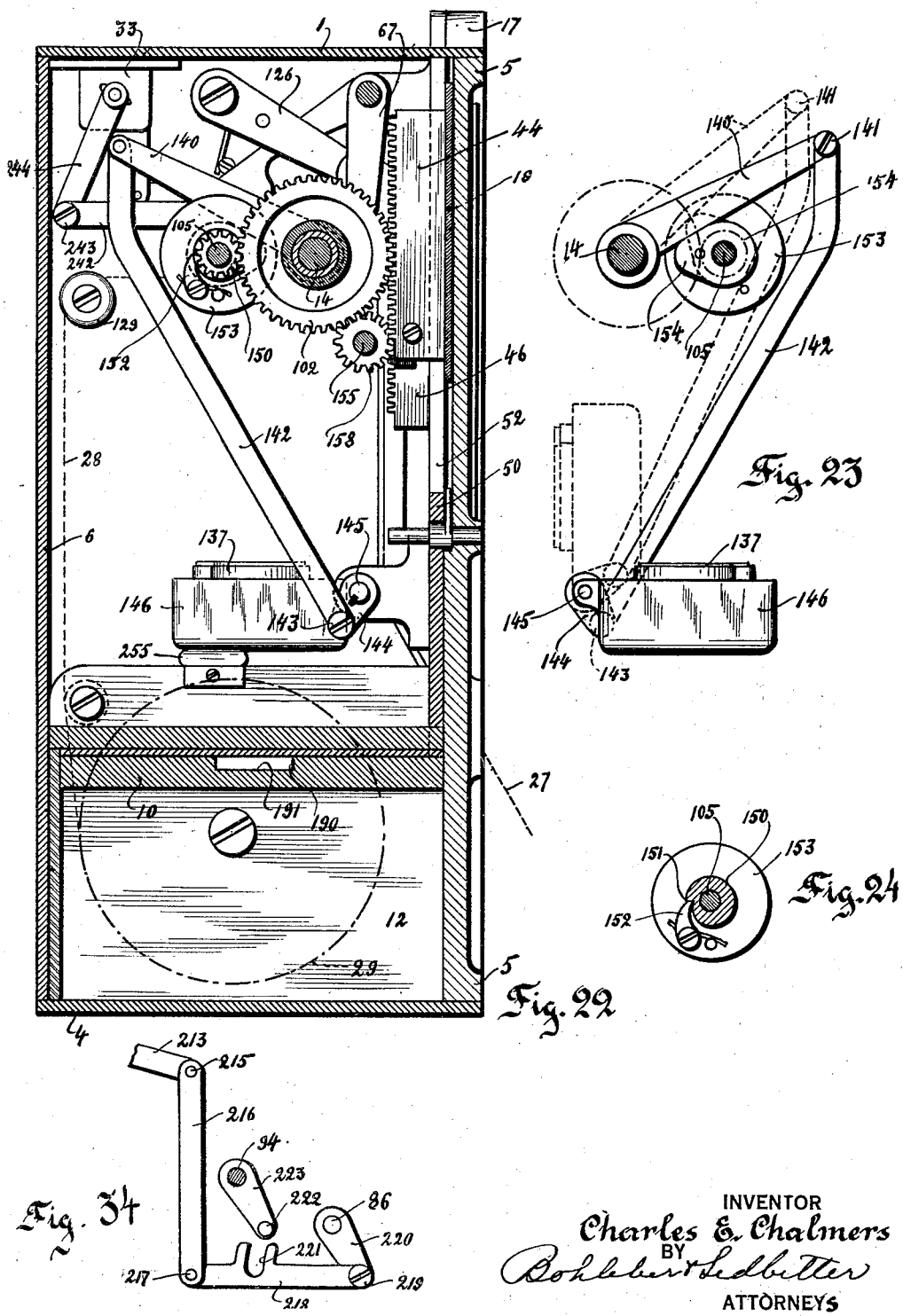

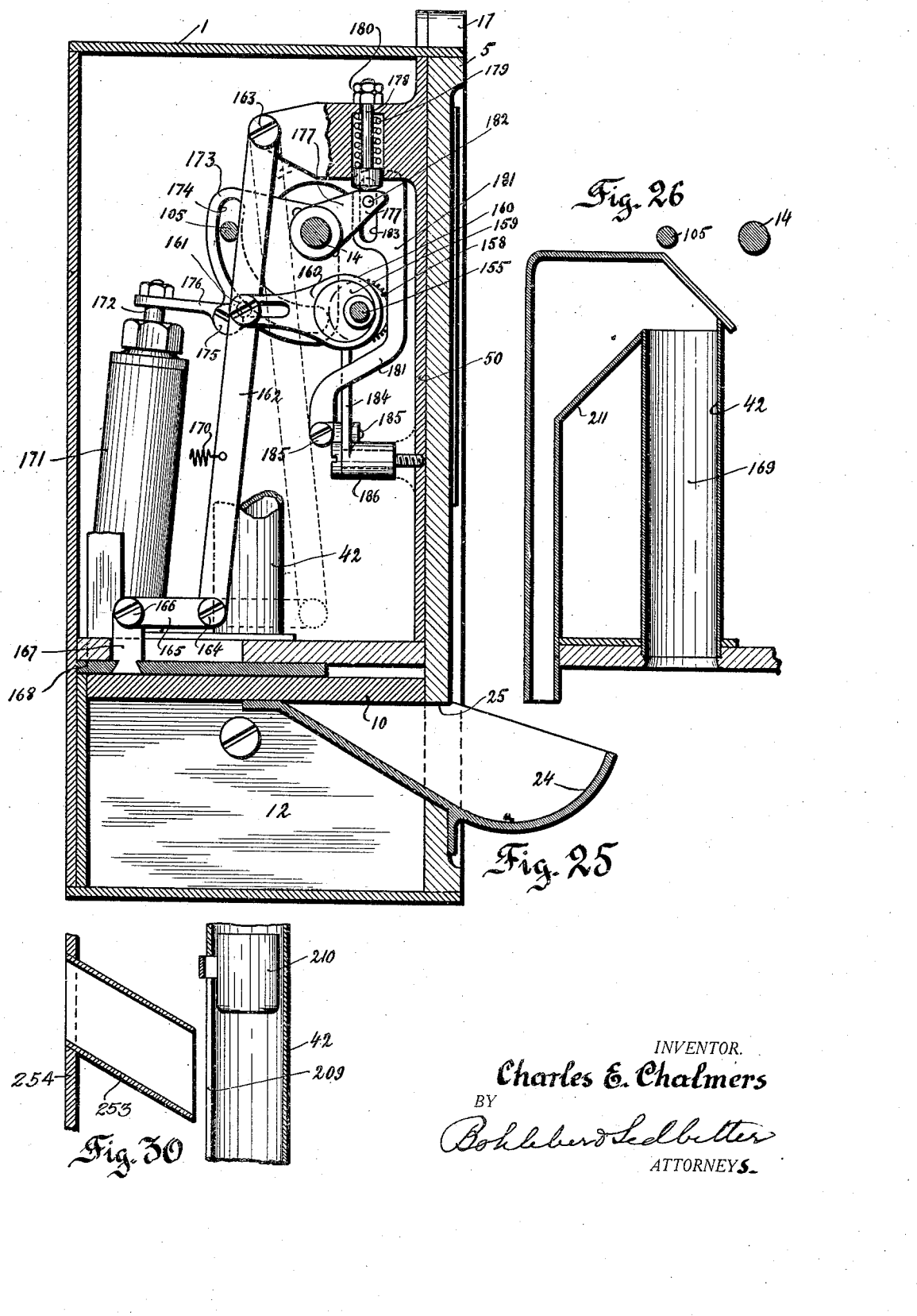

INVENTOR.
Charles E. Chalmers
BY
ATTORNEYS

Patented Apr. 21, 1931

1,801,800

UNITED STATES PATENT OFFICE

CHARLES E. CHALMERS, OF NEW YORK, N. Y.

TICKET-DISPENSING MACHINE

Application filed February 18, 1927. Serial No. 169,169.

This invention relates to a machine for automatically issuing tickets and the like. The important features of novelty of my invention reside not only in mechanism which enables a ticket to be issued by a coin or coins deposited in the machine for that purpose but also in mechanism which enables the issuing of tickets without the deposit of such coin or coins. Another important feature of novelty resides in a combination of mechanism whereby the ticket issued is printed with desired indicia thereon, such as the time when the ticket is issued. In its broad aspect the machine is capable of use where it is desired to issue any kind of a ticket, as on street cars and the like, in stores where commodities are sold, or in other places where it is desired to issue a ticket irrespective of whether or not a charge is made therefor.

One of the more important objects of the invention contemplates a machine which will eliminate or minimize the human factor and the possibility of mistake and dishonesty on the part of employees authorized to collect money.

Another important object of the invention is to enable the use of a machine of this character where the person in charge has other duties to perform, such as the so-called one-man cars where the motorman is required to collect fares, issue a ticket, make change, and act as a conductor.

A further object of this invention is to provide a machine which will be entirely automatic in its operation, and which is capable of operation by anyone to receive coins, to collect and register the desired amount, and return the necessary change in case the amount to be collected is less than the amount of the coin deposited.

It is another important object of my invention to provide a machine of the class described which cannot be fraudulently operated to return a greater amount of change than the amount deposited and at the same time be positive and reliable in operation at all times.

It is another important object of my invention to provide a machine which, when slightly modified, is capable of use solely as a mechanical changemaker and which will return the amount deposited in other coins; or which will collect a certain amount, such as a fare or charge to be made, and then return the difference in coin or coins of lesser denominations.

Another of the more important objects of my invention consists in equipping a machine of this character with mechanism which enables its instantaneous use for either issuing a ticket of some character without making a charge therefor or in issuing a ticket for which a specified charge is to be made.

Another of the more important objects of my invention consists in providing a machine of this character with mechanism which is properly set and controlled by the size of the coin or coins deposited in operative position therein and in which the mechanism is operated through the intermediary of the coins deposited. Also in providing mechanism which enables the use of coins deposited for change making.

Another important feature of my invention resides in the mechanism which readily enables the amount to be charged for a ticket to be varied at will.

In the operation of street cars and other vehicles where a fare is charged it not infrequently becomes necessary to issue a transfer "free" or for "a charge". These transfers require certain indicia to avoid fraudulent use thereof chief of which is the date and time of issue. This necessitates either the printing of tickets for each day in the year or the printing of tickets which require considerable time on the part of the conductor to properly punch the same to avoid fraudulent use thereof. It is therefore another of the more important objects of my invention to avoid this waste of printed matter and the waste of time on the part of the operator by providing economical and efficient mechanism which feeds a tape, automatically prints the necessary indicia on the end portion thereof and thereafter enabling such printed portion to be torn off and used as a transfer.

It is another important object of my invention to provide a compact, reliable and inexpensive machine which may be used in the expeditious collection of money and making of change in case where relative large number of relatively small coins must be handled and which will eliminate the loss due to mistake or dishonesty on the part of either the payer of the coin or the collector thereof.

The features of novelty which I believe to be characteristic of my invention are pointed out with particularity in the appended claims. In the accompanying drawings I have illustrated the invention as embodied in a machine for issuing street car transfer tickets and the like. In its broad aspect however, my invention may be embodied in other kindred machines and is not limited to the embodiment illustrated and described. However, my invention both as to its fundamental principles and as to one practical embodiment will be best understood by reference to the specification and accompanying drawings, in which:

Fig. 1 is a front perspective view of the machine made in accordance with my invention capable of issuing either a free transfer or of issuing a transfer for the sum of two cents. The position which the two pennies normally assume is illustrated in full lines while the position normally assumed by a nickel when that denomination of coin is utilized, is shown above the pennies in dotted line.

Fig. 2 is a left side elevation in which the operating handle is illustrated in three different positions the normal position being shown in full lines, the lower dotted lines illustrating the position to which the handle is moved in the operation of the machine, and the upper dotted lines illustrating the uppermost position the operating handle assumes when the latter is operated for returning or rejecting a coin or coins deposited.

Fig. 3 is a right side elevation illustrating a controlling member, located in front of a dial, the operation of which controls certain elements so as to enable the machine to issue a ticket free of charge or to issue a ticket for which a charge is to be made. There is also illustrated an index for indicating the amount of change contained in the coin magazine of the machine.

Fig. 4 illustrates a top plan view of the machine showing, among other things, the coin chute and the two counters the upper one of which counts the number of "free" tickets issued and the lower one of which counts the total number of tickets issued.

Fig. 5 is a rear or interior view of the front wall of the machine illustrating in their normal position the coin passages, coin gauges, coin gates or shutters, and associated mechanism.

Fig. 6 is a horizontal section taken on the line 6—6 of Fig. 5.

Fig. 7 is a view similar to Fig. 5 but illustrating the penny gauges and the shutters or gates in operation in a case where more than two pennies have been deposited and showing the parts, including the coins, in the position that they assume at the completion of the downward stroke of the operating handle.

Fig. 8 is a view similar to Fig. 7 in which a nickel is seen to be located in operative position in the machine and showing the parts in the position that they assume at the completion of the downward stroke of the operating handle. There is also shown two nickels arrested in the coin chute in inoperative position.

Fig. 9 is an interior or rear view of the front wall having the cover or supporting plate attached thereto but with the other mechanism of the machine, except such as is attached to the supporting plate, omitted therefrom, that is to say with the ticket issuing, printing and change making mechanism removed.

Fig. 10 is a vertical section taken on the line 10—10 of Fig. 9.

Fig. 11 is a vertical section taken on the line 11—11 of Fig. 9.

Fig. 12 is a full interior rear assembly view of the mechanism of the machine with the top, bottom, and side walls of the machine removed, the coin magazine being broken away and the printing lever omitted to better illustrate the mechanism as a whole.

Fig. 13 is a vertical section taken on the line 13—13 of Fig. 12 illustrating the ticket issuing and printing mechanism. In this view the top, rear, bottom, and front walls of the machine are illustrated in section.

Fig. 14 is a side elevation of the tape advancing and double counter operating mechanism.

Fig. 15 is a detailed view of the gear reduction mechanism employed in connection with the ticket tape advancing roller and of a portion of the mechanism employed for setting the machine to issue a ticket "free" or for a charge.

Fig. 16 illustrates a longitudinal cross section on the line 16—16 of Figs. 14 and 15 of the ticket tape advancing roller and the mechanism associated therewith to enable the machine to issue a "free" ticket or a "charge" ticket; there is also illustrated a portion of the "free" counter mechanism.

Fig. 17 illustrates a detail shown in Fig. 16 to be used to set the machine at will to issue a ticket "free" or for a "charge". The parts are illustrated in position to issue a "free" ticket.

Fig. 18 is a section taken on the line 18—18 of Fig. 16. It is also a rear view of Fig. 17.

Fig. 19 is a section taken on the line 19—19 of Fig. 16 showing a portion of the mechanism to operate the "free" counter when the machine is set to issue a "free" ticket.

Fig. 20 is a section taken on the line 20—20 of Fig. 16, the parts being shown in position to issue a "free" ticket.

Fig. 21 is a view similar to Fig. 18 with the parts set for issuing a ticket for a "charge".

Fig. 22 is a section taken on the line 22—22 of Fig. 12 showing the printing mechanism and a part of the "free" ticket counting mechanism.

Fig. 23 is a detail view on line 23—23 of Fig. 12 illustrating portions of the printing mechanism from the side opposite to that illustrated in Fig. 22, the printing position of which is illustrated in dotted lines.

Fig. 24 illustrates a detail of the printing mechanism taken on the line 24—24 of Fig. 12.

Fig. 25 is a section taken on the line 25—25 of Fig. 12 illustrating change making, rejecting and inking mechanism.

Fig. 26 is a longitudinal section of the coin magazine and the overflow tube connected thereto.

Figure 27:
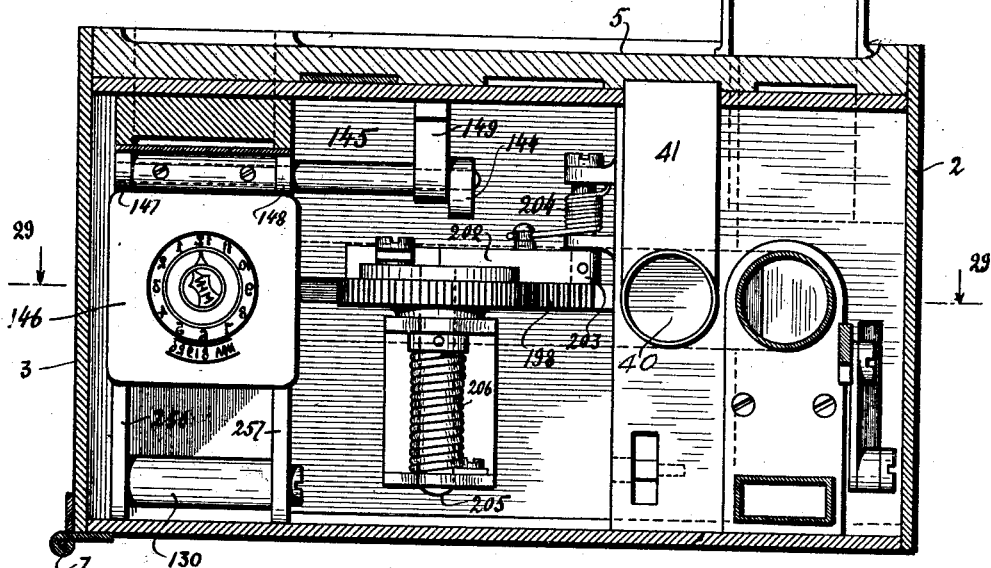

Fig. 27 is a horizontal section taken on the line 27—27 of Fig. 12.

Figure 28:
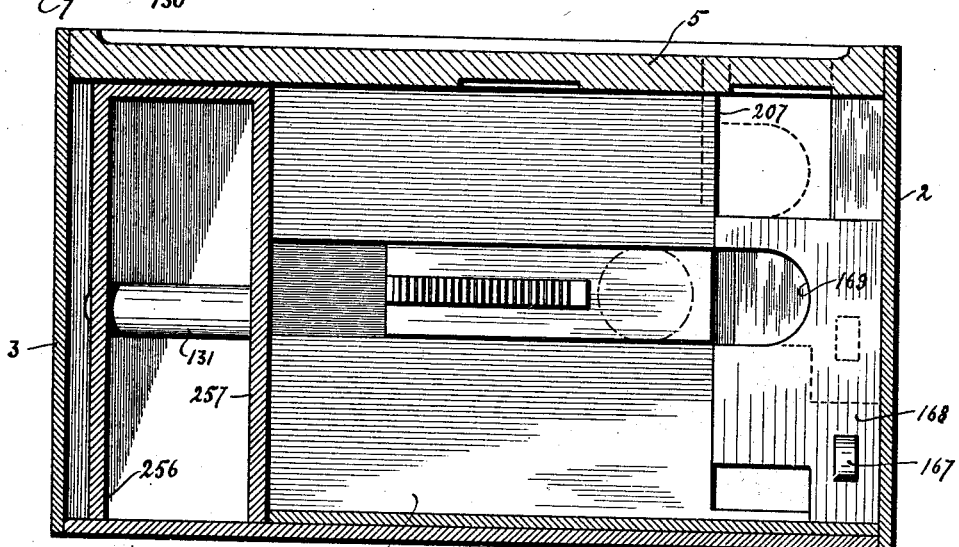

Fig. 28 is a horizontal section taken on the line 28—28 of Fig. 12.

Figure 29:
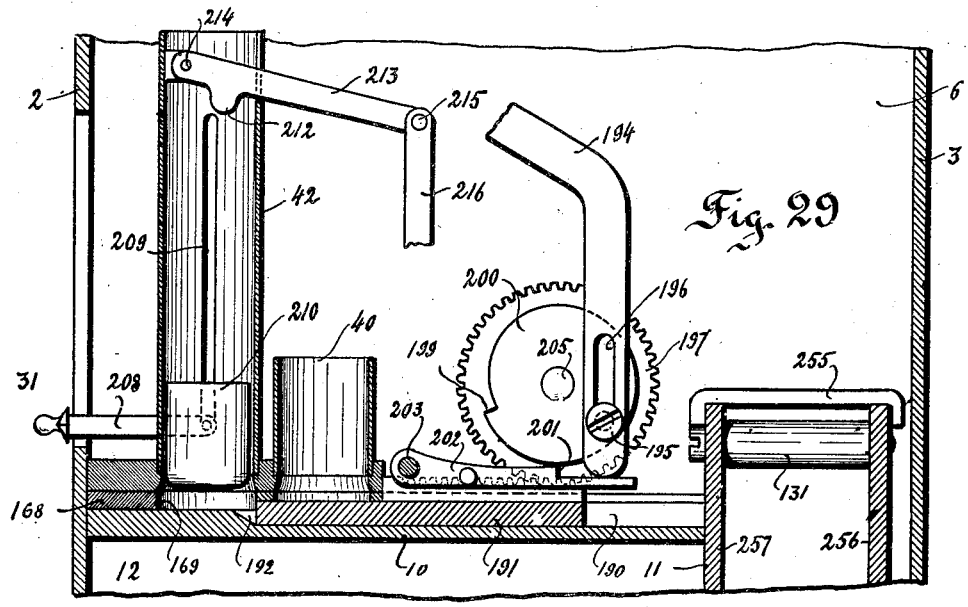

Fig. 29 is a vertical section taken on the line 29—29 of Fig. 27.

Fig. 30 is a vertical longitudinal section of supplementary mechanism for refilling the coin magazine with coins to be utilized for change making.

Figure 31:
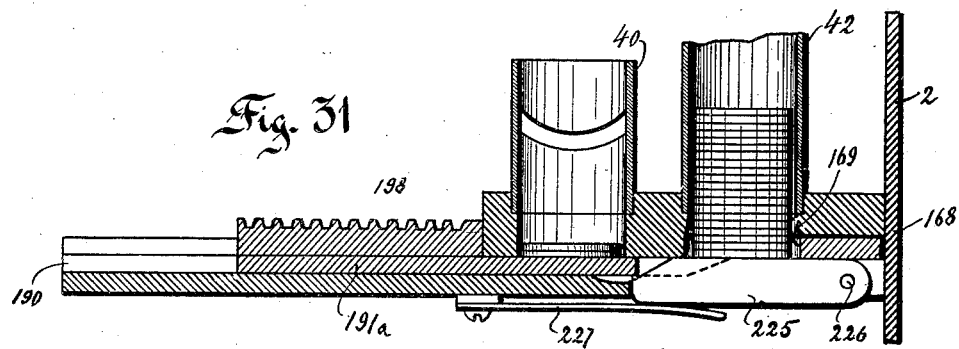

Fig. 31 illustrates a modified form of the coin magazine filling mechanism.

Figure 32:
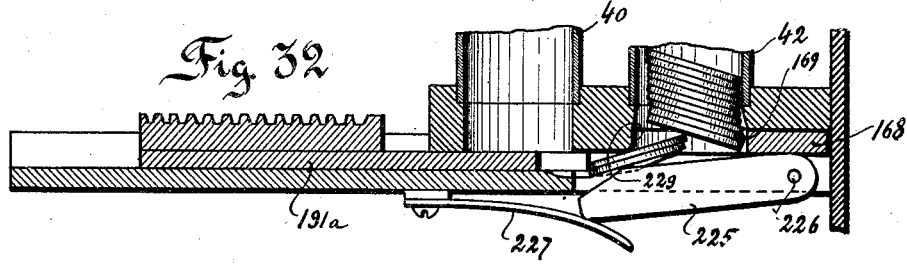

Fig. 32 is a view similar to Fig. 31 but illustrating the parts in different relative positions.

Figure 33:
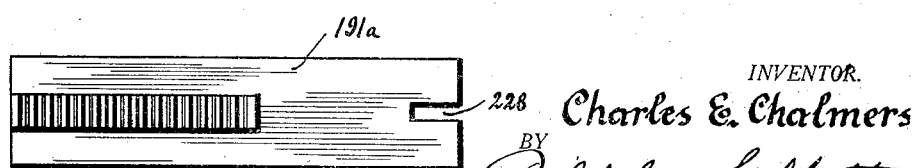

Fig. 33 is a top plan view of the magazine filling plunger or slide used in connection with the modified form of the invention shown in Figs. 31 and 32.

Fig. 34 illustrates a portion of the supplementary mechanism for operating the shutters.

As stated above the specific embodiment of my invention illustrated and described herein comprises a machine for issuing street car transfer tickets. The machine is so constructed that by the manual manipulation at will of a certain element hereinafter described a ticket is issued for a certain charge or a ticket is issued "free", that is, without a charge. In the embodiment illustrated and described herein the charge to be made is operable either by the deposit and through the medium of two pennies or by the deposit and through the medium of a nickel. When a nickel is deposited provisions are made for returning three cents as change. It will be understood however, from the detailed description below that tokens may be used, that any other charge may be made for a ticket, and that other denominations of coins may be utilized without departing from my invention. It may also be pointed out, as above suggested, that the principles of my invention may be readily adapted for the exclusive purpose of change making, that is to say, not only for the purpose of giving the exact change for a coin of higher denomination deposited but also for collecting a predetermined amount from such deposited coin. All of these features, characteristics, capabilities and objects of my invention will more fully appear hereinafter.

Referring to the drawings in detail, and first to the views illustrated in Figs. 1 to 4 inclusive, the reference numeral 1 designates the top, the numerals 2 and 3 the side walls, the numeral 4 the bottom, the numeral 5 the front wall, and the numeral 6 (see Fig. 13) the rear wall or door of the machine, the latter being hinged, as indicated at 7 to enable freedom of access to the interior of the machine. The rear wall or door 6 is preferably equipped with a suitable lock for preventing access to the interior of the machine by unauthorized persons. This locking mechanism is shown diagrammatically by the reference numeral 8. A suitable handle 9 is provided on the door 6 for the purpose of opening and closing the latter. The interior of the housing is divided by a horizontal division wall or sub-panel 10 and by a vertical division wall 11 into two compartments, one for containing the mechanism and the other for receiving at least some of the coins deposited, the latter being designated by the numeral 12. See, for example, Figs. 22 and 25.

The machine is provided with an operating handle 13 fixed upon the main horizontal shaft 14. While this shaft projects through the side wall 2 it has its bearings within the machine as will more fully hereinafter appear. The end of the shaft, opposite to the end upon which the operating handle 13 is mounted, is equipped with a stub shaft 15 coaxial with shaft 14 and projecting through the side wall 3, on which stub shaft is a controlling member 16 adapted to serve as a means for operating certain mechanism within the machine to enable tickets to be issued with or without charge being made therefor, as desired. A chute 17 is provided for receiving the coins which are utilized in the payment of a ticket. This chute 17 leads to a passageway 18 as illustrated in Fig. 1. This passageway 18 is defined by a plurality of movable gauges or plates 19, 20 and 21, front wall 5 and supporting plate 50 as clearly illustrated in Figs. 1, 5 and 10. It may be stated at this point that upon the actuation of the operating handle 13 the gauge or plate 19 is always moved; that gauge or plate 20 is moved to operate ticket issuing mechanism irrespective of whether or not a charge is to be made for the ticket; and that gauge or plate 21 is always moved when it is desired to return change for any coin deposited, in this case a nickel. It may be also stated at this point that in the embodiment of my invention herein illustrated and described the charge for a ticket is 2¢. Assuming that a charge is to be made the machine herein illustrated is designed to be actuated to dispense a ticket either through the intermediary of two pennies when deposited therein or through the intermediary of a nickel. However, it will be readily understood that the machine may be readily adapted to be operated by a different number of pennies or by a coin or coins of higher denominations than a nickel.

The coins deposited into the machine may be inspected through a transparent member 22 located in the frame 23. The member 22 is located in front of the passageway 18. The frame 23 is suitably secured to the front wall 5 of the machine as by a plurality of screws which enable the frame to be removed when desired, as for cleaning the transparent member 22. At 24 is illustrated a change return pocket, at 25 the opening through the front wall 5 leading thereto, and at 26 (see also Figs. 1, 5, 9 and 13) is generally indicated the exit opening for the printed ticket, the printed ticket itself being designated by the numeral 27 in Fig. 3, the tape from which the tickets are made by the numeral 28 and the roll of tape by the numeral 29. See Fig. 13. The reference numeral 30 designates a scale for indicating the amount of change coins contained or reserved in the coin magazine. When the magazine is full the pointer 31 will be at the upper extremity of the slot 32 and when the magazine is empty or practically empty the pointer 31 will be at the lower extremity of the slot 32. As shown in Fig. 3 the pointer indicates that the coin magazine in the machine is about half filled with change coins. The reference numeral 33 designates a counter for counting the number of tickets issued without charge whereas the numeral 34 designates a counter which totalizes the number of free tickets issued and the number of tickets issued for which a charge is made. It may be here remarked that the member 16 is in the shape of a pointer and preferably operates upon the face of a dial 35. This dial has suitable indicia thereon for the guidance of the operator such as the words "Free" and "Charge." This means that when the pointer points to the word "Free" a ticket will be issued without charge, but that when the same is moved to point to the word "Charge" a ticket will be issued only upon the deposit of coins of predetermined sizes and amounts. It may be noted that the pointer 16 may be equipped, and in actual practice is equipped, with a suitable key to lock it in either of its two operative positions.

Referring now more particularly to Fig. 5 the reference numeral 36 designates a groove on the interior of the wall 5 in which the plate member 19 reciprocates vertically. The reference numerals 37 and 38 designate continuations of the groove 36 and both are of the same depth. However, the coin groove 37 serves as a passage for the rejection of improper coins through the opening 25 to the receptacle 24 whereas the coin groove 38 serves as a passageway for discharging the nickels into the compartment 12 provided in the lower part of the machine. The groove 37 is provided with a branch 39 for conveying pennies from the passageway 18 into a receptacle 40 (see Fig. 12) centrally located in the machine. The receptacle 40 is equipped with an inclined slide member 41 (see Fig. 27) the outer and upper end of which rests on the bottom of the groove 39. From this receptacle the pennies are automatically fed into the coin magazine 42 in a manner to be explained later. The gauges or plates 20 and 21 are adapted to reciprocate vertically in the groove 43. See Figs. 7 and 8. This groove 43 is of the same horizontal depth as groove 36. Plates 19, 20 and 21 are all preferably of the same thickness and the thickness is slightly in excess of the thickest coin to be deposited in the machine, in this instance a nickel. The inner surfaces of these plates are also preferably flush with the inner surface of the front wall 5 of the machine as clearly indicated in Fig. 6. The plate 19 is equipped with a rack 44, the plate 20 with a rack 45, and the plate 21 with a rack 46. These racks are in engagement with and operated by suitable gears, more fully hereinafter described, to enable coins to be rejected, to enable coins to be conveyed into the machine and also to enable the operation of the change making and ticket issuing mechanism. The groove 38 is normally closed by means of a shutter 47 and the groove 39 is normally closed by a shutter 48, as clearly illustrated in Fig. 5. It will therefore be seen that if a coin or a slug of a diameter less than the diameter of a penny, for instance a dime, is deposited in the chute 17 it will, without interference, pass through the chute 17, passageway 18 and passageway 37 directly to the return receptacle 24 through the opening 25. When two pennies are deposited into the chute 17 and the machine operated by means of the handle 13 suitable mechanism is thrown into operation to enable the shutter 48 to be moved to the position illustrated in Fig. 7 and thus enable the pennies to be discharged from the groove 39 into the receptacle 40 illustrated in Fig. 12. When a nickel is deposited into the machine and the handle 13 actuated suitable mechanism is thrown into operation to move the shutter 47 to the position illustrated in Fig. 8 thus enabling the nickel to be discharged through the groove 38 directly into the compartment 12 located in the bottom of the machine.

As previously stated the parts illustrated in Fig. 5 are shown in their normal positions. When the shutter 48 is moved to the position illustrated in Fig. 7 the shutter 47 remains unaffected as shown. But when the shutter 47 is moved to the position indicated in Fig. 8 the shutter 48 is moved to the position shown in Fig. 7. This is due to the fact that when plate 21 is moved it carries plate 20 with it as will more clearly appear below. It may be pointed out here that the grooves 36 and 43 are in effect one groove having branches 37, 38, and 43a, and also that the passageway 18 is nothing more than a part of grooves 36 and 43 defined by the adjacent edges of the plates 19, 20 and 21. The plate 20 is equipped with a leg 20a extending into the groove 38 for the purpose of properly guiding the coins into the grooves 37, 38, and 39 and also with a leg 20b reciprocating in the groove 43a for properly guiding, in conjunction with leg 20a, the plate 20 in its vertically reciprocating movement.

In Fig. 9 there is illustrated, among other things, a supporting plate 50 for the interior of the front wall 5 suitably secured thereto as by a plurality of screws 51. Figs. 5, 7 and 8 show the plate 50 removed therefrom. The plate 50 is provided with slots 52, 53 and 54 through which the racks 44, 45 and 46 respectively project and in which they are guided in their upward and downward movements. The lower ends of these slots serve to limit the downward movements of the respective racks. The springs 55, 56 and 57 respectively serve to maintain the racks 44, 45 and 46 in their normal or upper position with respect to slots 52, 53 and 54. It will be observed that the cover or supporting plate 50 forms the rear wall of the chute 17 and transforms coin grooves 36, 43, etc., in coin passageways.

Referring again to Figs. 5, 7 and 8 it will be noted that to effect the operation of the machine through the intermediary of two pennies deposited in the slot 17 the plate 19 through rack 44 and gearing associated therewith is first moved downwardly until the shoulder 60 of the plate 19 engages with the upper surface of the upper penny after which a continued movement of the plate 19 will carry the pennies together with the plate 20 downwardly from the position illustrated in Fig. 5 to the limit of its movement indicated in Fig. 7. The downward movement of the plate 20, as just described, immediately initiates a clockwise rotation of the shutter 48 until the latter assumes the position illustrated in Fig. 7. As will be seen later it only requires a very slight initial movement of the plate 20 to effect a complete movement of the shutter 48. Without referring to the mechanism for doing it, the plate 20 and the shutter 48 are temporarily locked in the position indicated in Fig. 7 upon the release by the operator of the operating handle. Upon the release of the operating handle, however, the plate 19 immediately resumes its upward movement under the action of spring 55. After the plate 19 has partially returned to its normal position the lower end thereof will be withdrawn from the path of movement of the deposited coins and thus enable the latter to pass over the top of shutter 47 through the coin groove 39 into the receptacle 40. As the plate 19 approaches its upward extremity of movement suitable mechanism is operated thereby to unlock the plate 20 and thus enable the latter and the rack 45 carried thereby and mechanism associated therewith to be returned to normal position under the influence of the spring 56. When a nickel has been deposited in the machine and received in operative position in the passageway 18, as illustrated in Fig. 5, the plate 19 is moved downwardly as previously described until the shoulder 61 thereof engages with the periphery of the nickel. Further movement thereafter will cause the plate 21 to be moved downwardly through the intermediary of the nickel. This plate 21 simultaneously effects a downward movement of the plate 20. These movements of the plates 19, 20 and 21 are continued until they assume the position illustrated in Fig. 8. The initial downward movement of the plate 21 serves to move shutter 47 in a clockwise direction to the position illustrated in Fig. 8 so as to cause the nickel, when discharged from the passageway 18, to fall into the coin groove 38 from whence it passes to the coin compartment 12 of the machine. At the lower extremities of their movements the plates 20 and 21 are temporarily locked against retrogressive movement, as will fully appear later. Upon the release of the operating handle 13 the plate 19 and rack 44 begin to travel upwardly to their normal position. After a predetermined amount of upward movement the nickel, as will be understood, will be free to drop from the passageway 18 into the coin groove 38. The last lap of the upward movement of the plate 19, as will more fully hereinafter appear, serves to release the plates 20 and 21 from their locked position after which they will return to normal position under the influence of the springs 56 and 57, it being understood that the plate 19 and rack 44 will be returned to normal position, as before explained, under the influence of the spring 55.

It may be stated at this point that if desired any coins or slugs deposited in the passageway 18 may be returned or rejected by a reverse movement or upward stroke of the operating handle 13; that is from the full line to the upper dotted line position shown on Fig. 2. This reverse movement of the handle 13 through mechanism which will be presently described effects a slight upward movement to the plate 19 thereby releasing the coins or slugs as will be apparent from a casual inspection of Fig. 5.

The machine is so constructed that any number of pennies may be deposited into the chute 17 and the passageway 18, and if pennies only are deposited only the lowermost two will be received in operative position to dispense a ticket, the pennies above said lowermost two not affecting in any wise the operation of the machine. This is clearly illustrated in Fig. 7. If two or more nickels are deposited only the lowermost one will be received in operative position to dispense a ticket the upper ones, as illustrated in Fig. 8, being held against downward movement by means of a suitably operated stop finger 62 shown in Fig. 1. If succeeding nickels are not arrested against movement by some suitable means they will all be cleared from the chute 17 and passage 18 upon the release by the operator of the handle 13 bearing in mind that during the major portion of the return stroke of the handle 13 only the gauge 19 is returning towards normal position. Therefore when the lowermost nickel, upon a partial return of gauge 19, is released the succeeding nickels, if not arrested, will be free also to pass through the passageways 18 and 38 as will be apparent from an inspection of Fig. 8.

Pivotally mounted in suitable bearings 63 and 64 (see Figs. 9 to 12) located upon the front plate 50 is a shaft 65 equipped with a spring 66 tending to move the same in a clockwise direction as viewed from Figs. 10 and 11. Fixed to the shaft 65 is an arm 67 the free end of which is rounded and normally bears against a cam member 68 secured to and movable with the rack 44. Upward and downward movement of the rack 44 will therefore effect an oscillatory movement to the shaft 65 through the arm 67 and cam 68. Also fixed upon the shaft 65 is a pawl 69 the outer end of which is normally out of engagement with the rack 45 but adapted to engage with a shoulder 70 on the rack 45 when the latter is moved downwardly to the position indicated in Fig. 11. The engagement of the pawl 69 with the shoulder 70 of the rack 45 is permitted when the cam 68 passes from under the arm 67 whereby the shaft 65 is rotated under the influence of the spring 66. A collar 71 is rigidly mounted upon the shaft 65 and between this collar and the pawl 69 is a second pawl 72 loosely encircling the shaft 65 and equipped with a laterally projecting finger 73. The pawl 72 is limited in one direction of its movement by the engagement of its finger 73 with pawl 69. The finger 73 is held in contact with the pawl 69 by means of a suitable spring 74. The free end of the pawl 72 is adapted to engage with a shoulder 75 (see Fig. 7) on the rack 46 when the latter has been moved downwardly to its lowermost position. Normally the pawl 72 under the influence of the spring 74 bears through the arm 73 against the pawl 69. However, when the rack 45 is moved downwardly so that the free end of pawl 69 engages with the shoulder 70 then the free end of pawl 72 bears against the teeth on the rack 46 under the influence of the spring 74. Assuming that either the pawl 69 or the pawl 72 is in engagement with the shoulder 70 or the shoulder 75 respectively they are released therefrom by the upward travel of the rack 44 which carries with it, as previously stated, the cam 68 which engages in its upward travel with the outer end of the arm 67 and thereby rotates the shaft 65 in a counter-clockwise direction as viewed from Fig. 10 against the tension of the spring 66 thus releasing either or both of said pawls 69 and 72 from the shoulders 70 and 75.

Upon the shaft 65 are fixed two collars 76 and 77 (see Figs. 9 and 12) and between these collars is pivotally mounted upon said shaft the spring pressed finger 62 (previously referred to) adapted to project through a slot 78 in the supporting plate 50. The normal position of this finger is clearly illustrated in Fig. 10. The lower end of the finger 62 and the slot 78 are shown in Fig. 1. It is held in the position illustrated in Fig. 10 by means of a stop 79 located upon and supported by collars 76 and 77. When the shaft 65 is rotated clockwise in Fig. 10, as a result of the downward movement of the rack 44, the free end of the finger 62 will be projected through the slot 78 and when thus operated will engage any coin that happens to be located in the passageway 18 opposite the lower end of said finger 62 and prevent the same from passing downwardly to its operative position in the machine. This occurs only when an excessive number of coins have been deposited. Where the required number of coins is deposited, whether only one or more than one coin is required, the finger 62 will pass above the same and arrest the further deposit of coins into the passageway 18. It will be understood that the upward movement of the rack 44 will bring the came 68 under the free end of the lever 67 with a result that the shaft 65, collars 76 and 77 and stop 79 will be rotated counter-clockwise as viewed from Fig. 10, thus withdrawing the finger 62 from its contact with the coin, or out of the path of the coins as the case may be.

Pivoted at the point 80 (see Figs. 9 and 12) on the supporting plate 50 is a sector 81 at the outer periphery of which is pivotally connected at 82 one end of a link 83 the other end of said link being pivoted at 84 to an arm 85 rigidly mounted upon the shaft 86 of the shutter 48. This sector is moved in a counter-clockwise direction by the downward movement of the rack 45 with which it normally engages. This sector is held in normal engagement with the lower end of the rack 45 under the influence of the spring 87. It will be apparent that upon the initial downward movement of rack 45 the shutter 48 will be moved from its normal position shown in Fig. 5 to the position indicated in Fig. 7 and thus enable the coins to be discharged through the passageway 39 into the coin receptacle 40. Pivoted at the point 88 on the supporting plate 50 is a second sector like member 89 towards the outer periphery of which is pivotally connected at 90 one end of a link 91 the other end of said link being pivoted at 92 to the arm 93 mounted upon the shaft 94 of the shutter 47. The sector like member 89 is held in engagement with the lower end of the rack 46 by means of the spring 95. It will therefore be seen that upon the downward movement of the rack 46 the shutter 47, through the various connections just described, will be moved from its normal position indicated in Fig. 5 to the position indicated in Fig. 8, and thus enable the nickel located in operative position in the passageway 18 to be discharged into the passageway 38, and thence to the coin compartment 12.

Referring now more particularly to Figs. 9, 10, 11 and 12 the reference numerals 100 and 101 designate the two bearings for the main shaft 14. These bearings are mounted or supported upon the plate 50. Upon the shaft 14 is rigidly mounted a gear 102 always in mesh with the rack 44 and serving, when the main operating shaft 14 is oscillated by means of the operating handle 13, to reciprocate said rack 44 and thus operate the countershaft 65 in the manner heretofore described. The normal position of the rack 44 is indicated for example in Figs. 9 and 12. If now the handle is moved in a reverse direction, that is from the full line to the upper dotted line position shown in Fig. 2, the rack 44 will be moved upwardly, raising the plate 19 (see Fig. 5) and thus release or reject any coins in the coin chute 17 and passageway 18.

It will be noted from Fig. 5 that before the plate 19 engages with any of the coins in the passageway 18 a slight movement must be imparted to the rack 44 and plate 19 thus enabling in the interim, the operation of printing mechanism which will be presently described. When the plate 19 however, engages with the pennies in the passageway 18, the continued movement of the plate 19, through the instrumentality of the pennies located in the passageway 18, will impart a downward movement to the plate 20 and rack 45 as clearly indicated in Fig. 7. The rack 45 meshes with a gear 103 and rotates the same in a counterclockwise direction as viewed from Fig. 15. Gear 103 meshes with a pinion 104 freely rotatable upon a countershaft 105. The pinion 104 is rigidly mounted upon a concentric gear 106 the latter in turn meshing with the pinion 107 freely rotatable upon the left end of shaft 14. See Fig. 16. The pinion 107 has a laterally projecting sleeve 108 upon which the paper feed roller 109 is rotatably mounted. The arrangement between the rack 45 and the gear train is such that a full downward stroke of the rack 45 will impart a complete turn or rotation to the sleeve 108. On the interior of one wall of the feed roller 109 is mounted a pawl 110 which is adapted to engage a notch 111 in the sleeve 108 with the result that a downward movement of the rack 45 will cause the pawl 110 to engage the notch 111 and thus impart a complete counter-clockwise rotation to the feed roller 109 as viewed from Figs. 13 and 14, but when the rack 45 returns to its normal position the sleeve 108 will be free to rotate away from the end of the pawl without imparting any movement to the feed roller 109. The feed roller 109 is held against movement upon the return of the rack 45 by any suitable means. I have illustrated herein for that purpose a spring pressed arm 112, see Fig. 14, having a heel 113 thereon engaging with a correspondingly shaped notch 114 in the periphery of the roller 109. The movable end of the arm 112 is pivoted at 115 to one end of a link 116 the other end of said link being pivoted at 117 to arm 118 connected to a suitable counter 34 previously referred to. It will therefore be seen that upon each complete turn of the paper feed roller 109 the counter 34 will be operated whether a "free" or "charge" ticket be issued. The other elements of the mechanism shown in Figs. 15 to 21 have to do with the means for controlling the issuance of a "free" or a "charge" ticket and will be described in detail below.

Referring now more particularly to Fig. 13 there is pivoted at 125 upon the wall 3 a spring pressed arm 126 and upon the free end of the later is rotatably mounted a pressure roller 127 always pressing upon the paper feed roller 109. Upon the shaft 105 is rotatably mounted a second roller 128 serving to guide the ticket tape 28 to the paper feed roller 109. Upon the same wall 3 a third roller 129 and a fourth roller 130, serving as guides are provided to control the supply of the printing paper from the supply roll 29. The supply roll 29 is preferably mounted upon a removable shaft 131. To keep the printing paper taut at the various points a certain amount of resistance to movement is given to the feed roll 29. This may be accomplished by any suitable means as by a spring-pressed member 132 which bears against the periphery of the supply roll 29. After leaving the feed roller 109 the paper tape passes through a suitable passageway or channel 133 provided in the channel forming members 134 and 135. In the channel member 135 is an opening 136 through which the platen 137 is adapted to pass in order to print certain time or other indicia on the paper strip 28. The lower end of the channel member 134 terminates in a knife edge at the point 138 (or a special knife 139, as illustrated in Fig. 1, may be employed) so as to enable the projecting portion of the paper tape 28, which constitutes in effect a transfer ticket, to be separated or torn off at this point.

Pivotally connected to the shaft 14 (see Figs. 13, 22 and 23) is an arm 140 the free end of which is pivoted at 141 to one end of a link 142 the other end of said link being pivoted at 143 to the crank 144 rigidly connected to the pivot 145 upon which the clock mechanism 146 is rigidly mounted. The pivot 145 is mounted in the bearings 147 and 148 rigidly mounted preferably upon the channel member 135. If desired a third bearing member 149 may be employed for the pivot 145. See Fig. 27.

Upon the shaft 105 is freely rotatable a pinion rod 150 (see Figs. 12 and 22) which meshes with the main operating gear 102. Upon one end of this pinion is a notch 151 (see also Fig. 24) adapted to be engaged by a spring-pressed pawl 152. This pawl is mounted upon a disc 153 free to rotate upon the shaft 105. The disc in turn carries a cam 154 adapted to engage with the lever 140 to operate the printing mechanism. It will be noted (see Fig. 22) that during the preliminary downward movement of the rack 44, that is before the latter moves downwardly far enough to enable plate 19 to engage the coins in the passageway 18, a sufficient rotation will be imparted to the pinion 150, through the pawl 152, to effect a sufficient revolution to the cam 154 that the high point thereof, as indicated in dotted line in Fig. 23, will pass beyond the dead center after which the parts illustrated in dotted lines in Fig. 23 will be returned to normal position indicated in full lines as a result of the weight of the printing mechanism 137—146, that is, by gravity. The continued downward movement of the rack 44 will complete the rotation of the pinion 150 so that the pawl 152 will be in proper position to re-engage the notch 151 to repeat the operation. Upon the return movement of the rack 44 a complete reverse rotation will be imparted to the pinion 150 but as the notch 151 of the pinion in this case leaves the pawl 152 the printing mechanism will not be effected thereby.

Upon reference to Fig. 8 it will be noted that a five cent piece has been deposited in operative position in the machine. When a five cent piece is deposited, and the charge for a transfer ticket is two cents, three cents must be returned by the machine as change. On the downward movement of the plate 19, referring to Figs. 5 and 8, the upper shoulder 61 on the plate 19 engages with the five cent piece and moves the plate 21 and through plate 21 the plate 20 downwardly to the lower extremity of their movements. The effect of the downward movement of the plate 20 and rack 45 has already been explained. The downward movement of the plate 21 and rack 46 will first open the shutter 47 to enable the discharge of the five cent pieces into the passageway 38 and thence to the compartment 12 in the machine provided therefor. It will be noted that before the shoulder 61 of the plate 19 engages the five cent piece a certain predetermined movement of the plate 19 and rack 44 will be effected. The distance it has to thus move is exactly the same as the distance it has to move to enable the shoulder 60 to engage the one cent pieces in the pasageway 18 thus serving to operate the printing mechanism in the manner previously described. I will now proceed to describe the change returning mechanism the operation of which is effected, as previously stated, through plate 21 and rack 46.

There is shown at 155 (see Fig. 12) a shaft provided with a bearing 156 at one end thereof and a bearing 157 at the opposite end thereof. Upon this shaft 155 is fixed a small gear 158 which meshes with the rack 46. The gear 158 is so constructed as to size that a full stroke of the rack 46 will impart a one-half rotation thereto and to the shaft 155. Adjacent the bearing 156 and fixed to the shaft 155 is an eccentric 159 (see Fig. 25) suitably engaging one end of and operating the eccentric arm 160. The other end of the arm 160 has a pin and slot or lost motion connection at 161 to the link 162, one end of said link being pivoted at 163 to some fixed part of the machine and the other end of said link being pivoted at 164 to one end of another link 165. The other end of the link 165 is pivoted at 166 to a member 167 projecting upwardly from the slide member or plunger 168. The slide member 168 is adapted to be reciprocated back and forth to eject three pennies from the bottom of the coin magazine 42 into the change return receptacle 24. Referring to Fig. 25 it will be noted that a one-half rotation of the gear 158 will move the links 162 and 165 to the dotted line position and when so moved will effect the discharge of the change coins as previously stated. The reverse rotation of the pinion 158 will return the eccentric 159 and arm 160 to normal position. The links 162 and 165 will be returned to normal position under the influence of a suitable spring 170. The purpose of the lost motion connection 161 is to enable the links 162 and 165 to be moved manually back and forth in order to reciprocate the slide member 168 and thus discharge coins from the coin magazine 42 into the coin receptacle 24 whenever that is desired, as when it is desired to ascertain how many coins at any given time said coin magazine contains.

At 171 (see Fig. 25) is illustrated a pivoted dashpot, the piston rod 172 of which is free to move upwardly but is provided with suitable means for retarding it in its downward movement. Rigidly connected to the shaft 14 is a sector 173 provided with a slot 174 therein to receive the shaft 105 and thus enable the sector to rotate without any interference from shaft 105 passing through said slot 174. Pivoted to the sector at the point 175 is one end of an arm 176, the other end of the said arm being connected with the piston rod 172 so that a rotation in the clockwise direction of the shaft 14 will move the piston rod 172 upwardly. Simultaneously with said movement of the piston rod will be a downward movement of the plate 19. It will therefore be seen that upon the return movement of the plate 19 under the influence of the spring 55, the said movement of the plate 19 will be retarded by the dashpot 171. The object of this is to provide ample time to enable the coins in the passageway 18 to be discharged from the lower end thereof, that is to be cleared, before the beginning of the return movement of the plates 20 and 21.

It is important that the plate 19 be maintained substantially in the position illustrated in Fig. 5. Remembering that the spring 55 maintains the rack 44 and plate 19 in their upper positions, it will be understood that some means must be provided for limiting the upward movement of plate 19 and rack 44. This mechanism comprises an arm 177 fixed upon the shaft 14 (see Fig. 25), the outer end of said arm engaging with a spring pressed adjustable member 178, the spring 179 thereof being stronger than the spring 55 so as to completely resist or overcome the tension of the latter. It will therefore be seen that the member 178, arm 177 and spring 179 resist the further movement of shaft 14, main gear 102 and rack 44, and thus prevent any further upward movement of the plate 19. The member 178 is adjustable by means of nuts 180. However, when it is desired to reject a coin or coins deposited in the machine, the plate 19 can be moved up slightly against the tension of the relatively strong spring 179 by means of an upward movement of the crank arm 13, as indicated in Fig. 2, and when said arm is again released the member 178 is returned to its normal position under the influence of the spring 179 bringing the plate 19 back to its normal position. The arm 177 has a lost motion connection with one end of a link 181 as by a pin 182 upon the former and a slot 183 in the latter. The other end of the link 181 is connected to an arm 184 by a universal connection 185. The arm 184 is pivoted at 186 to the supporting plate 50. The arm 184 and the link 181 are held in their normal positions under the influence of a spring 187. See Fig. 12. Upon the actuation of the operating handle 13 which rotates the shaft 14, the arm 177 will be moved downwardly, and as there exists between said arm and said link 181 a lost motion connection, the link 181 will not, for the moment, be operated. The purpose of this lost motion connection is to enable the operation of the printing clock 146 to take place before the link 184 carries the ink pad 188 in contact with the printing platen 137 on the clock 146. However, the continuation of the downward movement of the arm 177 imparts a downward movement to the link 181 and link 184, thus bringing the ink pad 188 into contact with the platen 137 of the clock 146 and thus ink or reink the platen. It will, of course, be understood that the clock 146 will have returned to its normal position before inking pad 188 starts its downward movement for inking or reinking purposes.

It has already been explained how the pennies are discharged from the passageway 18 into the receptacle 40. It has also been stated that the pennies, after their discharge into receptacle 40, are transferred from receptacle 40 to the coin magazine 42. The transferring mechanism will now be described in detail. At the lower end of the supporting plate 50 is mounted the sub-panel 10. In this sub-panel is a groove 190 adapted to receive a slide member 191. The groove 190 extends under the coin receptacle 40. The normal position of the slide 191 is illustrated in Fig. 29, from which it will be seen that the pennies discharging into the receptacle 40 will normally rest upon the slide as is clearly illustrated in Fig. 31. Referring again to Fig. 29, it will be apparent that when the slide member 191 is moved to the right, the coins will drop into the bottom of the groove 190. On the return stroke of the slide 191 the three lowermost coins will be moved through the opening 192 into the coin magazine 42, and in this manner the coin magazine is kept constantly loaded or replenished with pennies for change making purposes. Upon the oscillating gear 102 is pivoted a projection 193 (see Fig. 12). Pivotally connected to the projection 193 is one end of a link 194, the other end of said link having a pin (195) and slot (196) connection to the gear 197, the latter meshing with a rack 198 suitably secured to the slide 191. It will therefore be seen that the oscillatory movement imparted to the gear 102 by means of the handle 13 will impart a movement to the gear 197. As viewed on Fig. 29 an upward movement of the link 194 will move the gear 197 in a counterclockwise direction and thereby the rack 198 and slide 191 to the right until the shoulder 199 located upon the disc 200 engages behind the shoulder 201 on the pawl 202. The pawl is pivotally mounted at 203 and said pivot is equipped with a spring 204 (see Fig. 27), tending to lift the free or outer end of the pawl so that the shoulder 201 thereon will be engaged behind the shoulder 199 on the disc 200 when the gear 197 has been moved for a predetermined distance in a counter-clockwise direction. Owing to the lost motion connection 195—196, the main gear 102 and link 194 are free to return to their normal positions without imparting any movement to the gear 197 and its associated mechanism. The gear 197 is located upon a shaft 205 equipped with a spring 206 (see Fig. 27) tending normally to move said gear in a clockwise direction (as viewed from Fig. 29) and thus tending to move the slide 191 to the left to its normal position. As the link 194 moves downwardly in its travel to normal position the lower end thereof contacts with the outer end of the pawl 202 and thus releases the shoulder 199 of the disc 200 from the shoulder 201 of the pawl, and thus enabling the gear 197 and the disc 200 carried thereby to rotate in a clockwise direction under the influence of the spring 206 to resume their normal position. This causes the pin or stud 195 to travel to the lower end of the slot 196 in the link 194.

Upon the initial movement of the operating handle 13, the member 168 begins to move to return change from the coin magazine 42 and simultaneously with this movement the slide 191 begins its movement to the right as viewed from Fig. 29 or to the left as viewed in Fig. 28. However, it is necessary that the member 168 be returned to normal position so as to bring the opening 169 therein into registry with the groove 190 before the slide 191 is permitted to return to normal position and this delayed return movement of the slide 191 is effected by the mechanism just described. The sub-panel 10 is equipped with an opening 207 to enable the discharge of coin from the opening 169 of the member 168 to the receptacle 24.

Reference has been previously made (see Fig. 3) to an indicator 31 to indicate the amount of coins in the coin magazine 42. This indicator is mounted upon an arm 208 (see Fig. 29) which passes through a longitudinal slot 209 into the coin magazine 42 and which is secured to a weighted member 210 the latter being adapted to move upwardly upon the feeding of coins into the bottom of the magazine and adapted to move downwardly when the coins are discharged from the coin magazine in the manner previously described. This weighted member also serves the purpose of keeping the coins in the coin magazine 42 in a flat position, one above another. In Fig. 26 there is shown an overflow 211 connected to the magazine 42. However, when the weighted member 210 is employed, a different form of overflow mechanism is employed. Therefore, when the weighted member 210 (see Fig. 29) rises to the top of the coin magazine, it engages a heel 212 on the arm 213 pivoted at 214 at one end and pivoted at 215 at its opposite end to one end of a link 216. The other end of this link 216 (see Fig. 34) is pivoted at 217 to one end of a link 218 the other end of the latter being pivoted at 219 to an arm 220 mounted upon the shaft 86 of the shutter 48. The link 218 is equipped with an upwardly projecting slot 221 adapted to straddle the pin 222 on the arm 223 fixed to the shutter shaft 94 when the said link is raised by arm 213 and link 216; that is when the coin magazine 42 is filled to the limit determined by the mechanism just described. This mechanism couples up both shutters 47 and 48 to operate in unison with a result that each time the machine is operated under the stated circumstances the shutter 47 will be moved to the position shown in Fig. 8.

It will therefore be seen that when the coin magazine is filled with coins, the weight 210 will operate the mechanism just described to enable the discharge of coins from the passage-way 18, through passageway 38, directly into the coin compartment 12 located in the bottom of the machine with the result that no further coins, with the mechanism in this position, will be fed to the coin receptacle 40 and coin magazine 42 until the level of the coins in said magazine recedes as a result of the utilization of coins therein for change making. When the overflow, such as shown in Fig. 26 is employed, I have found it desirable to provide mechanism for maintaining the coins in flat position in contact with one another and this mechanism is illustrated in the modified form shown in Figs. 31, 32 and 33. This mechanism comprises a spring pressed member 225 pivoted at 226 and held in a normal position illustrated in Fig. 31 by means of a spring 227. The slide member 191a is equipped with a slot 228 (see Fig. 33) in the end thereof for the purpose of straddling the pivoted member 225 and thus enabling a movement of the slide 191a to the right to the position indicated in Fig. 31. When the slide 191a is moved to the left by the mechanism previously described, the coins in the coin receptacle 40 drop to the bottom of the groove 190, but when pushed to the right the lowermost coins are discharged from the bottom of the coin receptacle 40 and moved to the right into the coin magazine 42. The movement of the coins to the right in the manner just described causes a counter-clockwise movement of the arm 225 about its pivot 226 as illustrated in Fig. 32, thus enabling the said coins to be discharged into the lower end of the coin magazine 42. When the end of the slide 191a is in alignment with the wall 229 at the lower part of the coin magazine 42, the spring 227 will force the member 225 upwardly into normal position thus arranging the coins flatwise in said magazine 42 as illustrated in Fig. 31. It is at this point that the outer end of the spring pressed arm 225 passes into the slot 228 of the slide 191a.

It was stated above that in one position of the controlling member 16 certain mechanism was set to enable a ticket to be issued only for a "charge" and when in the other position the mechanism was set to dispense a ticket "free" of charge. I will now describe in detail the mechanism associated with and actuated by the member 16 to accomplish the results stated, the same being shown in Figs. 15 to 21 both inclusive. This member 16, as before stated, is fixed upon the outer end of the shaft 15 the latter being in coaxial alignment with the main shaft 14. The inner end of the shaft 15 is not only enlarged but is centrally cored as indicated at 15a, to telescope with the reduced portion 230 of the main shaft 14. The inner end of the stub shaft also terminates in an irregularly shaped flange or disk 231 (see Fig. 17) located within the peripheral plane of the gear 103 already described. Fixed to the main shaft 14 is a disk 232 which carries a spring-pressed pawl 233 provided with a pin projecting from each side thereof and for convenience the same will be referred to as two pins designated by the reference numerals 234 and 235. The gear 103 has an axial portion 236 extending along the shaft 14. This extension 236 is provided with a tooth or shoulder 237 adapted to be engaged by the pawl 233. The disk 232 is also equipped with an axial portion 238 through which extends a pin 239 to key the same to the shaft 14. Around the axial extension 238 of the disk 232 is mounted an arm 240 relatively movable about the axis of the shaft 14 as a center. This arm is pivoted at 241 to one end of a link 242 the other end of said link being pivoted at 243 to the outer end of an arm 244 to operate the "free" counter 33. The arm 240 is equipped with an axial portion 245 extending in a direction opposite to the direction of the extension 238 of the disk 232. The periphery of the axial portion 245 is provided with a tooth or shoulder 246 adapted to be engaged by the pin 235 of pawl 233. The flange 231 is cut-away at one point of the periphery as indicated at 247 to provide a cam surface so that when rotated by the controlling member 16 the pin 234 of the pawl 233, under the influence of spring 250 will ride thereover from the high point 248 to the low point 249, and vice versa.

When the controlling member 16 is in the position shown in Fig. 3 the mechanism is rendered operative upon the actuation of the handle 13 to issue a ticket without the deposit of any coins, the various parts being in the position shown in Figs. 15, 16, 17, 18, 19 and 20. In this position the pin 234 of the pawl 233 is at the low point 249 of the cam 247 thus enabling the pawl to engage the tooth or shoulder 237 on the axial extention 236 of the gear 103 and also enabling the pin 235 to engage with the tooth or shoulder 246 on arm 240. It will therefore be seen that upon the rotation of the main shaft 14, by a downward movement of the handle 13, the disk 232, pawl 233 and pin 235 will impart a corresponding angular movement to the arm 240 and thus, through the connection already described, actuate the arm 244 of the free counter 33. As the pawl is also in engagement with the tooth or shoulder 237 of the gear 103 a corresponding angular movement will be imparted to the latter, and as said gear is in mesh with rack 45 a downward movement will be imparted to said rack and plate 20 to operate the ticket tape mechanism, in the manner fully described above, to issue a ticket.

If now the controlling member 16 is moved from the "free" position to the "charge" position indicated in Fig. 3 the flange or disk 231 will be moved the same angular distance to the position illustrated in Fig. 21. This movement of the disk causes the pin 234 to ride from the low point 249 of the cam surface 247 to the high point 248 thereof the effect of which is to move the pawl 233 and the pin 235 radially outward so that upon a rotation of the shaft 14 and the disk 232 carried thereby the pawl 233 (which is carried by disk 232) will not engage the shoulder 237 on the gear 103 and the pin 235 will not engage the tooth or shoulder 246 on the arm 240. Therefore with the parts in this position only the disk 232 and the pawl 233 carried thereby will be moved, the arm 240 and the gear 103 remaining stationary. It will be noted however, that as the "high" point 248 of the cam 247 of the disk 231 is slightly depressed to receive the pin 234 of the pawl 233 the said disk 231, shaft 15 and member 16 will oscillate as a unit with the disk 232; in other words in this position the "high" point or seat 248 (of the cam) and the pin 234 provide an impositive lock to maintain the parts in this position, and when in this position the rack 45 and plate 20 can only be operated to issue a ticket by the deposit of a coin in the manner previously described. It will also be noted that when the parts are in this position the gear 103 is entirely free to be actuated from the rack 45 to operate the tape feeding roller 109 in the manner also previously described. When the mechanism is set to issue a "free" ticket it will be understood that the shaft 15, controlling member 16 and disk 231 also operate and move as a unity with gear 103 and the elements operatively associated with the latter. In passing it may be stated that the disk 232 is provided with a slot 251 through which the pin 235 projects not only to enable the radial movement of said pin but also to enable said pin to engage with shoulder 246. Likewise the gear 103 is provided with an arcuate slot 252 to accommodate the movements of pin 234 over the cam surface 247 of disk 231.

In Fig. 30 I have illustrated means to enable the coin magazine to be replenished with coins to be utilized for change making purposes. This comprises a narrow downwardly inclined chute 253 capable of holding the coins in a vertical position and to feed the same when deposited therein to the coin magazine 42 through the vertical slot 209. The chute 253 is suitably supported by a member 254 which may be one of the walls of the container.

If it is desired to fix a charge for a ticket different from that indicated herein then it is only necessary to change the thickness of the plunger 168 and to properly proportion the plates 19, 20 and 21 to enable the latter to operate the mechanism in the manner previously described.

If it is desired to utilize the principles of my invention solely for change making purposes that is readily feasible by properly proportioning the size of the plunger 168 so as to enable it to eject five pennies for a nickel deposited in the machine. Also if denominations of coins are to be utilized, different than those referred to herein, then it is only necessary to properly proportion the plates 19, 20 and 21, as will be understood.

As clearly indicated in Fig. 12 the printing clock 146 normally rests upon a padded support 255 which is mounted upon the parallel planes 256 and 257 between and upon which the paper roll 29 and guide 130 are supported.

As previously stated I have illustrated and described herein merely the preferred embodiment of my invention, and it is therefore to be expressly understood that I do not limit myself thereto as many changes may be made in points of detail and other embodiments resorted to without deviating from the true spirit and scope of my invention.

What I claim and desire to secure by Letters Patent is:

1. A ticket dispensing machine comprising a plurality of movable coin gauges defining a passageway for receiving different denominations of coins in operative position in the machine, means actuated by the movement of one of said movable gauges for issuing a transfer or other ticket, and manually actuated means rendered operative and controlled by the deposited coin or coins for effecting a movement of said gauge which actuates said ticket issuing means.

2. A ticket dispensing machine comprising a plurality of movable gauges defining a passageway for receiving different denominations of coins in operative position in the machine, means actuated by the movement of a plurality of said gauges for issuing a transfer or other ticket, and manually actuated means rendered operative by a deposited coin or coins for effecting a movement of said gauges which actuate the ticket issuing means.

3. In a ticket dispensing machine, a plurality of movable gauges for defining a passageway for receiving different denominations of coins in operative position in the machine, means actuated by the movement of one of said gauges for issuing a transfer or other ticket, and means for effecting a movement to the last mentioned gauge through the intermediary of the coin or coins deposited comprising another of said gauges, and means for actuating said last mentioned gauge.

4. A ticket dispensing machine comprising a common passageway for receiving coins into operative position in the machine, and manually actuated means rendered operative by the coins deposited for issuing a transfer or other ticket, in combination with manually controlled means for rendering said manually actuating ticket issuing mechanism directly operative whereby a ticket is issued free of charge.

5. A ticket dispensing machine comprising a common passageway for receiving coins into operative position in the machine, and manually actuated means for issuing a transfer or other ticket free of charge, in combination with manually controlled means for rendering said manually actuated ticket issuing means operative through the intermediary of the coin deposited.

6. A ticket dispensing machine comprising a common passageway for receiving coins into operative position in the machine, mechanism for issuing a transfer or other ticket, means for actuating said ticket issuing mechanism, and controlling means for rendering said last mentioned means operative to issue a ticket at will either by or without the deposit of coins.

7. A ticket issuing machine comprising a single passageway for receiving coins of different denominations into operative position in the machine, means for issuing a transfer or other ticket, and manually actuated means rendered operative and controlled by the coin or coins deposited for operating said ticket issuing means, in combination with manually controlled means to enable the ticket issuing means to be operated directly from the manually actuated means whereby a ticket may be issued without charge.

8. A ticket issuing machine comprising a plurality of movable coin gauges defining a passageway for receiving different denominations of coins into operative position in the machine, means actuated by the movement of one of said movable gauges for issuing a transfer or other ticket, and manually actuated means rendered operative and controlled by the deposited coin or coins for effecting a movement of said gauge which actuates said ticket issuing means, in combination with manually controlled means to enable said gauge to be operated directly from the manually actuated means whereby a ticket may be issued without a charge.

9. In a ticket issuing machine, a plurality of movable gauges for defining a passageway for receiving different denominations of coins into operative position in the machine, means actuated by the movement of one of said gauges for issuing a transfer or other ticket, and means for effecting a movement to the last mentioned gauge through the intermediary of the coin or coins deposited comprising another of said gauges, and means for actuating said last mentioned gauge, in combination with manually controlled means to enable the first gauge to be operated directly from the second gauge whereby a ticket may be issued without a charge.

10. A ticket issuing machine comprising a plurality of movable gauges defining a passageway for receiving different denominations of coins into operative position in the machine, means actuated by the movement of one of said gauges for issuing a transfer or other ticket, manually actuated means, including another of said gauges, rendered operative by a deposited coin, for effecting a movement of said gauge which actuates the ticket issuing means, and a third gauge rendered operative by the deposited coin for returning change.

11. A ticket dispensing machine comprising means for conveying coins into operative position in the machine, a transfer or other ticket issuing means, and means for actuating said second mentioned means, in combination with mechanism for rendering said second and third mentioned means operative through the intermediary of the coins deposited, and manually controlled means for effecting an operative relationship directly between said second and third mentioned means to issue a ticket without charge.

12. A ticket issuing machine comprising a plurality of movable coin gauges defining a passageway for receiving different denominations of coins into operative position in the machine, means actuated by the movement of one of said movable gauges for issuing a transfer or other ticket, manually actuated means rendered operative and controlled by the deposited coin or coins for effecting a movement of said gauge which actuate said ticket issuing means, and means rendered operative by deposited coins of a predetermined size for returning change.

13. A ticket issuing machine comprising a plurality of movable gauges defining a passageway for receiving different denominations of coins into operative position in the machine, means actuated by the movement of one of said gauges for issuing a transfer or other ticket, manually actuated means, including another of said gauges, rendered operative by a deposited coin, for effecting a movement of said gauge which actuates the ticket issuing means, and means rendered operative by deposited coins of a predetermined size for returning change.

14. In a ticket issuing machine, a plurality of movable gauges for defining a passageway for receiving different denominations of coins into operative position in the machine, means actuated by the movement of one of said gauges for issuing a transfer or other ticket, and means for effecting a movement to the last mentioned gauge through the intermediary of the coin or coins deposited comprising another of said gauges, means for actuating said last mentioned gauge, and means rendered operative by deposited coins of a predetermined size for returning change.

15. A ticket issuing machine comprising, a single passageway for receiving coins of different denominations into operative position in the machine, means for issuing a transfer or other ticket, manually actuated means rendered operative and controlled by the coin or coins deposited for operating said ticket issuing means, means rendered operative by deposited coins of a predetermined size for returning change, and means for utilizing coins deposited for change making.

16. A ticket issuing machine comprising a plurality of movable coin gauges defining a passageway for receiving different denominations of coins into operative position in the machine, means actuated by the movement of one of said movable gauges for issuing a transfer or other ticket, manually actuated means rendered operative and controlled by the deposited coin or coins for effecting a movement of said gauge which actuates said ticket issuing means, means rendered operative by deposited coins of a predetermined size for returning change, and means for utilizing coins deposited for change making.

17. A ticket issuing machine comprising a plurality of movable gauges defining a passageway for receiving different denominations of coins into operative position in the machine, means actuated by the movement of one of said gauges for issuing a transfer or other ticket, manually actuated means, including another of said gauges, rendered operative by a deposited coin, for effecting a movement of said gauge which actuates the ticket issuing means, means rendered operative by deposited coins of a predetermined size for returning change, and means for utilizing coins deposited for change making.

18. In a ticket issuing machine, a plurality of movable gauges for defining a passageway for receiving different denominations of coins into operative position in the machine, means actuated by the movement of one of said gauges for issuing a transfer or other ticket, and means for effecting a movement to the last mentioned gauge through the intermediary of the coin or coins deposited comprising another of said gauges, means for actuating said last mentioned gauge, means rendered operative by deposited coins of a predetermined size for returning change, and means for utilizing coins deposited for change making.

19. A ticket dispensing machine comprising means controlled by the coins deposited for printing and issuing a transfer or other ticket, in combination with means cooperating with the aforesaid means for utilizing coins deposited for change-making.

20. A ticket dispensing machine comprising means controlled by coins deposited for printing and issuing a transfer or other ticket, in combination with means cooperating with the aforesaid means for returning change, and means for utilizing coins deposited for change making.

21. In a ticket dispensing machine, means controlled by coins deposited for issuing a transfer or other ticket, in combination with mechanism for utilizing coins deposited for change making comprising a receptacle in the machine for receiving coins, a coin magazine adapted to receive a stack of coins, means for conveying coins from receptacle to the coin magazine, and means actuated by the ticket issuing means and controlled by the size of the coin deposited for ejecting coins as change from said coin magazine.

22. A ticket dispensing machine comprising a common means for receiving coins of different denominations into operative position in the machine, means rendered operative by the coins deposited for issuing a transfer or other ticket, means for segregating the coins of different denominations deposited into different pockets or compartments, means rendered operative by deposited coins for returning change, and means for utilizing coins deposited for change making.

23. A ticket dispensing machine comprising a single passageway for receiving coins of different denominations, into operative position in the machine, means for printing and issuing a transfer or other ticket, and manually actuated means rendered operative and controlled by the coin or coins deposited for operating said ticket printing and issuing means.

24. In a ticket dispensing machine, a common passage for receiving coins into operative position in the machine, means for issuing a transfer or other ticket comprising means for printing certain indicia on a tape, means for feeding said tape to expose the printed portion thereof to enable it to be segregated from the tape, and means rendered operative by the coins deposited for operating said ticket printing and feeding means.

25. A ticket dispensing machine comprising means controlled by coins deposited for issuing a transfer or other ticket, in combination with mechanism cooperating with the aforesaid means for returning change and means which enables the operation of the machine to be varied at will to issue a transfer or other ticket with or without charge.

26. A ticket dispensing machine comprising means controlled by coins deposited for issuing a transfer or other ticket, in combination with mechanism cooperating with the aforesaid means for returning change, means which enables the operation of the machine to be varied at will, to issue a transfer or other ticket with or without charge, and means for utilizing coins deposited for change making.

27. In a coin operated machine, a chute, a common passageway for receiving a plurality of deposited coins from said chute, a passageway leading from said chute to enable the coins deposited to be received into the machine, a third passageway to enable the return of the coins deposited, in combination with mechanism controlled by the operator for directing the coins in the first mentioned passageway into either of said second or third mentioned passageways, said mechanism including means for selectively receiving the requisite number of deposited coins located in the first mentioned passageway to render the machine operative.

28. In a coin operated machine, a chute, a common passageway for receiving a plurality of deposited coins from said chute, a passageway leading from said chute to enable the coins deposited to be received into the machine, a third passageway to enable the return of the coins deposited, in combination with mechanism controlled by the operator for directing the coins in the first mentioned passageway into either of said second or third mentioned passageways, said mechanism including means when coins are to be received into the machine, for arresting those coins in the passageway in excess of the number of coins required to operate said machine.

29. A ticket dispensing machine comprising a common passageway for receiving coins into operative position in the machine, and means controlled by the coins deposited for printing and issuing a transfer or other ticket, in combination with means rendered operative by the coins deposited and adapted to be actuated in one direction for operating said ticket issuing means and adapted to be actuated in the other direction to reject the coins deposited.

30. A ticket dispensing machine comprising a common passageway for receiving coins into operative position in the machine, means for issuing a transfer or other ticket, and mechanism rendered operative by the coin or coins deposited and adapted to be actuated in one direction for operating said ticket issuing means and adapted to be operated in the other direction to reject the coins deposited, in combination with means cooperating with said mechanism for utilizing coins deposited for change making.

31. A ticket dispensing machine comprising mechanism for receiving coins into operative position in the machine, and means controlled by the coins deposited for printing and issuing a transfer or other ticket, in combination with means cooperating with the aforesaid means for returning change, and means for utilizing coins deposited for change making.

In testimony whereof, I have hereunto affixed my signature this 15th day of February, 1927.

CHARLES E. CHALMERS.